United States Patent [19]

Singh et al.

[11] Patent Number: 4,728,712
[45] Date of Patent: Mar. 1, 1988

[54] METHOD OF PRODUCING MERCAPTAN TERMINATED POLYMERS WITH INCREASED REACTIVITY AND REDUCED ODOR

[75] Inventors: Hakam Singh, Bradburry; Jack W. Hutt, Tarzana, both of Calif.

[73] Assignee: Products Research & Chemical Corp., Glendale, Calif.

[21] Appl. No.: 12,091
[22] PCT Filed: Jun. 11, 1985
[86] PCT No.: PCT/US85/01105
§ 371 Date: Jan. 22, 1987
§ 102(e) Date: Jan. 22, 1987
[87] PCT Pub. No.: WO86/07369
PCT Pub. Date: Dec. 18, 1986
[51] Int. Cl.$^4$ ............................................. C08G 18/10
[52] U.S. Cl. ....................................... 528/75; 528/55; 528/86; 528/374; 528/375; 528/376; 528/373; 528/388

[58] Field of Search ............... 528/374, 375, 376, 388, 528/55, 75, 86, 373

[56] References Cited
U.S. PATENT DOCUMENTS

| | | | |
|---|---|---|---|
| 2,466,963 | 4/1949 | Patrick et al. | 528/387 |
| 3,431,239 | 3/1969 | Morris et al. | 528/86 |
| 3,912,758 | 10/1975 | Weaver | 528/386 |
| 3,923,748 | 12/1975 | Hutt et al. | 528/49 |

Primary Examiner—Melvyn I. Marquis
Attorney, Agent, or Firm—Poms, Smith, Lande & Rose

[57] ABSTRACT

A method for producing mercaptan terminated liquid polymers with increased chemical reactivity and reduced odor is disclosed which involves heating the polymeric liquid material under conditions which avoid oxidation and depolymerization of the material while removing at least 50 weight percent of low molecular weight mercaptan compounds to produce a stripped polymer material having an increased cure rate and reduced obnoxious mercaptan odor.

18 Claims, No Drawings

METHOD OF PRODUCING MERCAPTAN TERMINATED POLYMERS WITH INCREASED REACTIVITY AND REDUCED ODOR

BACKGROUND OF THE INVENTION

Of increasing commercial value are mercaptan terminated liquid polymers exemplified by the early polysulfide material produced under U.S. Pat. No. 2,466,963. More recent polymers include the mercaptan terminated polyethers of U.S. Pat. No. 3,431,239, and the mercaptan terminated urethane modified polyethers of U.S. Pat. Nos. 3,923,748, 3,446,780, and German Pat. No. 0,066,167. Mercaptan terminated polythioethers are disclosed in U.S. Pat. No. 4,366,307.

The mercaptan terminated polymers are typically supplied as liquid materials which are applied to various surfaces and cured to form solid elastomeric sealants. All of these liquid materials contain small quantities (0.5 to 3 weight percent) of low molecular weight mercaptan compounds which produce undesirable odors that generally limit application of the sealants to well ventilated areas. Attempts have been made to reduce the odors by heating batches of the liquid material under vacuum, with or without the presence of an inert gas. However, the polymers frequently depolymerize, oxidize or otherwise decompose before a low odor product is obtained.

It would be desirable to provide a method for treating the liquid mercaptan terminated polymer materials to reduce the level of odor causing low molecular weight mercaptan compounds in the liquid material without decomposing or otherwise adversely affecting the material.

Most of the presently available single component sealants based upon mercaptan terminated liquid polymers cure from the polymer surface inwards into the body of the polymer at a rate of around 1 mm per day. The cure rate may be increased using various additives, such as catalysts and promoters. Also curing conditions may be controlled in order to increase cure rates. Shortened cure times are desirable since it reduces the amount of time that the applied sealant exists in a tacky, non-solid form. Accordingly, there still is a present need to provide methods for increasing the cure rate of the liquid mercaptan polymers without adversely affecting the quality of the cured elastomer sealant.

SUMMARY OF THE INVENTION

In accordance with the present invention, a method is disclosed in which the level of odor producing mercaptan compounds present in liquid mercaptan terminated polymers is reduced without adversely affecting the liquid polymer. In addition, we surprisingly discovered that the cure rate for mercaptan terminated liquid polymers treated by our method is substantially increased over untreated mercaptan terminated liquid polymers.

The present invention is based on the discovery that mercaptan terminated polymers containing from about 0.5 weight percent to about 3 weight percent low molecular weight mercaptan compounds can be heated under certain conditions for short periods of time to remove at least 50 weight percent of the low molecular weight mercaptan compounds without decomposing the polymer to thereby produce a liquid mercaptan terminated polymer having an increased cure rate and a reduced obnoxious mercaptan odor.

The method of the present invention basically involves heating the mercaptan terminated polymer to a sufficient temperature and for a sufficient length of time to vaporize at least about 50 weight percent of the low molecular weight obnoxious smelling mercaptan containing compounds. The heating of the mercaptan terminated polymer is carried out for a sufficiently short time and under specific conditions as will be described below to prevent decomposition of the liquid mercaptan terminated polymer while providing the desired vaporization of at least 50 weight percent of the mercaptan compounds. The mercaptans which are vaporized or stripped from the liquid mercaptan terminated polymer are separated from the polymer to produce a stripped liquid mercaptan terminated polymer having the desired reduced obnoxious mercaptan odor and the additional unexpected benefit of an increased cure rate. The increase in cure rate for compositions incorporating polymers treated in accordance with the present invention was found to be 2-5 times that of compositions including non-treated polymer. This increase in cure rates is especially advantageous because it is accomplished without the need to add extra catalysts or promoters which may alter the final cured product.

The above discussed and many other features and attendant advantages of the present invention will become apparent as the invention becomes better understood by reference to the following detailed description.

DETAILED DESCRIPTION OF THE INVENTION

The present invention is a method for treating liquid mercaptan terminated polymers to remove low molecular weight mercaptan containing compounds present in the polymer. The method has wide application to liquid mercaptan terminated polymers in general, such as those set forth in the background of the invention. These polymers typically have a molecular weight of at least 1,000. The polymers also typically contain from about 0.5 weight percent to about 3 weight percent of low molecular weight mercaptan compounds. The mercaptan compounds typically have a molecular weight of less than about 300 and also have an obnoxious smell. The mercaptan compounds tend to vaporize from the mercaptan terminated polymer when it is applied so that application of the polymer must take place in well ventilated areas. Typical low molecular weight mercaptan compounds include a,w-dimercapto diethyl sulfide, a,w-dimercapto diethyl ether, 1,8 dimercapto-3,6dioxaoctane, 1,2 dimercaptoethane, dimercaptodiethyl formal, o,o'-dimercaptomethyl diphenyl ether, 2-mercaptoethanol, 2-mercaptopropanol, 3-mercaptopropanol, 3-mercaptobutanol and 4-mercaptobutanol.

As mentioned in the background of the invention, previous attempts to separate these mercaptan compounds from bulk polymer material were unsuccessful due to depolymerization and oxidation of the polymer. This decomposition of the polymer results in the formation of a material, which after curing, is softer than the corresponding non-decomposed polymer.

We found that by increasing the exposed surface of the mercaptan terminated polymer, we could reduce the amount of heating necessary to vaporize the mercaptan compound so that removal of substantial amounts of the mercaptan compounds could be accomplished without decomposing the liquid polymer. The following description and examples will be limited to a method in which a thin film of the polymer is heated to accomplish the desired mercaptan compound vaporization without polymer decomposition. It should be understood that other methods for increasing the exposed surface of the liquid polymer may be utilized so long as at least 50 weight percent of the mercaptan containing compound can be removed or stripped from the polymer without any significant amount of polymer decomposition occurring. Decomposition of the polymer results from depolymerization and/or oxidation of the polymer.

Spreading of the liquid polymer film may be carried out by any number of methods. The film must have a thickness of less than about 6 mm and preferably should have a thickness of about 1 to 2 mm. In order to achieve the desired reduction in obnoxious mercaptan odor and increased cure rate, it is necessary to vaporize at least about 50 weight percent of the low molecular weight mercaptan compounds present in the initial polymer film.

The vaporization or stripping is accomplished by heating the film for a sufficient time to vaporize at least about 50 weight percent of the mercaptan compound from the film. The temperature to which the film is heated may be varied from room temperature up to about 200° C. The preferred temperature range is between about 135° C. and 175° C. In order to increase the vaporization at a particular temperature, it is necessary that a vacuum be applied to the film. Preferably this vacuum will be between 1 mm Hg. and 100 mm Hg.

The length of time necessary to vaporize at least 50 weight percent of the mercaptan compounds will vary depending upon a number of factors including the temperature to which the film is heated, the vacuum applied to the film, the amount of organic solvent added to the polymer and the flow rate of any carrier gasses. Within the preferred temperature range of 135° C. to 175° C., the dwell time must be kept to a minimum in order to prevent decomposition of the polymer. Dwell time at elevated temperatures of less than 2 minutes are preferred.

A preferred apparatus for carrying out the method of the present invention is a wiped film evaporator or still. A wiped film evaporator is a well known commercially available apparatus which is designed to spread a thin film of material over the inside surface of a vertical cylinder. The apparatus generally includes an inlet at the top or upstream end of the cylinder where the liquid to be spread is introduced. The liquid is spread by spring loaded rotating blades as a thin film over the inside surface of the cylinder with the film continually flowing towards the bottom of the cylinder. As the film reaches the bottom or downstream end of the cylinder, the material is removed for further processing. The cylinder walls are maintained at the desired elevated temperature in order to provide the necessary heating of the thin film. A cold condenser is mounted on the side of the vertical cylinder for condensing the vapors which are stripped from the film as it flows from the upstream end of the cylinder to the downstream end.

Since wiped film evaporators are typically gravity fed devices, it is important that the viscosity of the liquid polymer be such that it flows down the cylinder wall at a sufficiently rapid rate to provide the desired residence time of the film within the evaporator. In the preferred temperature range of 135° to 175° C., the flow rate of the film down the evaporator walls must be such that there is a residence time of 2 minutes or less. Residence time of 20 to 30 seconds are preferred. In order to achieve the desired viscosities, it is usually necessary to add a compatible organic solvent to the liquid polymer. Suitable solvents include xylene, toluene and aromatic naptha having a boiling point of between 110° C. and 150° C. Other organic solvents may be utilized so long as the boiling point of the solvent at atmospheric pressure is at or below the temperature to which the polymer is heated, but not less than 50° C. below this temperature. The solvent should be added in an amount sufficient to maintain the flow of the polymer as it travels from the upstream end of the cylinder to the downstream end to provide the desired dwell times. The amount of solvent added is preferably between 5 to 100 percent by weight of the liquid mercaptan terminated polymer. The more solvent added, the higher the mercaptan compound removal, however, too much solvent is undesirable since it results in large amounts of solvent being vaporized and processed. Solvent levels of 10–35 percent by weight of the polymer are particularly preferred.

Sweeping gasses may be used to enhance the vaporization rate of the mercaptan compounds from the polymer film. Suitable gasses include nitrogen, carbon dioxide or other gasses which are inert with respect to the polymer film. The gas is swept by the film surface to help remove and separate the mercaptan compounds.

In order to fully illustrate the invention, examples of practice are set forth below. All of the examples were conducted using a conventional gravity feed, cylindrical glass wiped film still or evaporator. The particular still used was Model No. 40343 available from Pope Scientific Co. The still included a standard wiping blade arrangement with the inside glass cylindrical surface having a diameter of 6 inches and a length of approximately 2½ feet.

EXAMPLE 1

Stripping of a Mercaptan Terminated Polysulfide Polymer

A polysulfide polymer of 4,000 molecular weight and 2.2 functionality as described in U.S. Pat. No. 2,466,963, known commercially as Thiokol LP-32 was blended with 10 weight percent of xylene. The wiped film still was heated to 150° C. and a vacuum of 30" mercury applied along with a slow sweep of nitrogen into the column. The unstripped polymer was slowly introduced over a period of one hour and volatiles collected by a condenser. The introduction rate was controlled to produce a residence time for the polymer in the still of about 20 seconds and a film thickness of about 2 mm. The stripped product was removed from the bottom of the still. It was found that 1.5% of low molecular weight mercaptan material had been vaporized, condensed and removed. The reduction in mercaptan compounds was ascertained by the change in molecular weight fraction below 300 as determined through gel permeation chromatographic analysis.

EXAMPLE 2

Stripping of a Mercaptan Terminated Polyether Urethane

A mercaptan terminated polymer of 5,000 molecular weight and 2.5 functionality was made according to examples I & II of U.S. Pat. No. 3,923,748. The mercaptan content was 2.2 weight percent. The polymer was blended with 30% by weight of xylene. The unstripped polymer was passed through the glass wiped film still over a period of one hour at 305° F. and a vacuum of 30" of mercury. The film thickness and residence times were kept the same as in Example 1. The low molecular weight mercaptan content of the stripped polymer was 0.4% after this treatment.

The low molecular weight mercaptan content for the stripped and unstripped polymers was determined as follows: 5 grams of polymer was shaken with 50 grams of isooctane for 10 minutes at room temperature. The solvent phase was withdrawn and the residue shaken again with 50 grams of isooctane. The extracts were mixed with 35 ml. of a 50/50 MEK/toluene mixture and 1 ml. of pyridine and titrated with 0.1N iodine solution to determine the mercaptan content.

The percentage of low molecular weight (free) mercaptan is calculated by the formulas:

$$X = \text{number of equivalents of free mercaptan} = \frac{T_1^2 \times 10^{-4}}{T_1 - T_2}$$

where $T_1$ = mls $I_2$ used to titrate first extract and, $T_2 = I_2$ used to titrate the second.

$$\% \text{ free mercaptan} = X \frac{(\text{equivalent weight mercaptan}) \times 100}{5}$$

EXAMPLE 3

Effect of Boiling Point of Solvent on Stripping

The unstripped polymer of Example 2 was blended with 30% by weight of toluene and passed through the wiped film still as in Example 2. Analysis of the final stripped product revealed a low molecular weight mercaptan content of 0.8%.

EXAMPLE 4

Effect of Solvent Content on Stripping

The unstripped polymer of Example 2 was blended with 20% by weight of xylene and passed through the wiped film evaporator as in Example 2. The residual low molecular weight mercaptan content of the stripped polymer was found to be 0.7%.

EXAMPLE 5

Effect of Omission of Solvent

The unstripped polymer of Example 2 was passed through the wiped film evaporator at 163° C. without dilution. The free mercaptan found was 1.0%. A second pass through the wiped film evaporator reduced the free mercaptan to 0.6%. Some darkening which is believed to be deomposition of polymer was also observed.

EXAMPLE 6

Effect of Heating on Bulk Polymer

Polymer as described in U.S. Pat. No. 3,923,748 and marketed by the assignee of the present invention as Permapol P-2 was used. 250 grams of this polymer was placed in a round bottom flask kept at 160° C. for 8 hours under a vacuum of 30" mercury. At the end of this period the free mercaptan content of the bulk polymer had dropped from 2.1% to 0.4%. However, when the polymer was cured as a two component material using a 50% manganese dioxide paste in dioctyl phthalate, in reduction in Shore A hardness from 34 to 4 was obtained indicating partial depolymerization. After processing the same polymer according to the procedure in Example 2, a Shore A hardness of 30 was obtained as compared to 32 for unstripped material indicating practically no decomposition.

EXAMPLE 7

Stripping of a Mercaptan Terminated Polyether Urethane Made with a Mercapto-alcohol A mercaptan terminated polyether urethane according to Example 2 of U.S. Pat. No. 3,446,780 wherein mercaptoethanol is used as the terminating agent was blended with 30% by weight xylene and passed through the wiped film still at 135° C. and 30 inches of mercury. The film thickness and residence times were the same as in Example 1. The initial free mercaptan content was 0.4 weight percent. The free mercaptan content of the stripped product was less than 0.1%.

EXAMPLE 8

Stripping of a Mercaptan Terminated Polythioether

A mercaptan terminated polythioether described in U.S. Pat. No. 4,366,307, Example 16 was mixed with 40% by weight of xylene and passed through the wiped film evaporator at 163° C. and a vacuum of 30" mercury. Film thickness and residence times were the same as in Example 1. The free mercaptan content of the polymer was reduced to 0.5% from 2.6%.

EXAMPLE 9

Demonstration of Improved Cure in a Single Component Sealant Based on Polysulfide Polymer Stripped and unstripped polymer from Example 1 was used in the following one component sealant formulation:

|  | Parts by Weight |
| --- | --- |
| Polysulfide Polymers of Example 1 | 100 |
| Octyl Benzyl Phtalate | 37 |
| Isodecyl Adipate | 15 |
| Calcium Carbonate | 55 |
| Titanium Dioxide | 10 |

The above formulation was blended thoroughly and then the following ingredients were added under a protective nitrogen atmosphere:

| Strontium Peroxide | 12 |
| --- | --- |
| Potassium Fluoride | 3 |
| Manganese 2-Ethyl Hexoate | 0.5 |

Each of the compounded, single component sealants was filled into an aluminum channel 15 mm × 100 mm with the depth varying from 0 to 20 mm. The samples were cured for 30 days at 20° C. and 65% relative humidity with depth of cure readings taken at various intervals. The depth of cure is found by peeling away the specimen from the channel, beginning at the thin end, until the point is reached where the tacky sealant prevents further removal. The depth of the channel at this point is recorded.

The results of the composition between the cure rates for the two polymer compositions is set forth in Table I. As can be seen, the composition containing the stripped polymer cured initially over three times as fast as the composition containing the unstripped polymer.

The two compounded sealants of Example 9 were also tested for rate of tensile strength development and rate of modulus development. Each compounded sealant was pressed between two sheets of siliconized paper to a thickness of 2 mm and allowed to cure for various intervals from 2 to 50 days at 20° C. and 65% RH. Tensile specimens were cut and tested per ASTM D 412. The results are given in Tables II and III. The results show that the rates for tensile strength development and modulus development are also substantially increased for the composition containing stripped polymer.

EXAMPLE 10

The stripped and unstripped polymers of Example 2 were used in the following single component formulations:

|  | Parts by Weight |
|---|---|
| Mercaptan Terminated Polyether Polymer of Example 2 (stripped or unstripped) | 100 |
| Dioctyl Phthalate | 140 |
| Calcium Carbonate | 320 |
| Titanium Dioxide | 25 |
| Catalyst Paste |  |
| Ferric Dimethyl Dithiocarbamate | 0.1 |
| Dioctyl Phthalate | 3.0 |

-continued

|  | Parts by Weight |
|---|---|
| Calcium Carbonate | 4.0 |

The skin time and tack free time were determined and are tabulated below:

|  | Stripped | Unstripped |
|---|---|---|
| Skin Time | 60 minutes | 2 hours |
| Tack Free Time | 2 hrs. 55 min. | 4 hours |

The "skin time" is defined as the length of time at 25° C. and 50% relative humidity (RH) for a 6 mm thick sample to show evidence of surface cure. A probe pushed against the surface will show wrinkles indicating skin formation. The "tack free time" is the time under the same curing conditions for the material to show no adhesion to a polyethylene film pressed against the surface.

The cure through time for the two polymer compositions was determined as in Example 9. As shown in Table I, the cure rate for the "stripped" composition was over two times faster than that for the unstripped composition. Cured sheets of the two compositions were also prepared as in Example 9 for modulus and tensile strength determination. The results are shown in Tables II and III.

TABLE I

COMPARISON OF CURE RATES OF ONE COMPONENT SEALANTS USING "STRIPPED AND "UNSTRIPPED" MERCAPTAN TERMINATED POLYMERS

| | Cure Depth-Millimeters | | | | | |
|---|---|---|---|---|---|---|
| | Formulation of Example 9 | | Formulation of Example 10 | | Formulation of Example 13 | |
| Days | Stripped | Unstripped | Stripped | Unstripped | Stripped | Unstripped |
| 1 | 1.8 | 0.5 | 2.1 | 0.8 | 2.1 | 1.7 |
| 2 | 3.0 | 1.0 | 3.0 | 1.7 | 2.6 | 2.2 |
| 5 | 4.7 | 2.2 | 6.1 | 2.8 | 4.7 | 3.5 |
| 10 | 8.2 | 3.7 | 9.8 | 4.6 | 6.0 | 4.5 |
| 20 | 10.8 | 5.1 | 13.1 | 7.0 | — | — |
| 30 | 12.9 | 6.0 | 15.6 | 8.2 | — | — |

TABLE II

COMPARISON OF RATE OF TENSILE STRENGTH DEVELOPMENT OF ONE COMPONENT SEALANTS USING STRIPPED AND UNSTRIPPED MERCAPTAN TERMINATED POLYMERS

| | Formulation of Example 9 | | Formulation of Example 10 | | Formulation of Example 13 | |
|---|---|---|---|---|---|---|
| Days | Stripped | Unstripped | Stripped | Unstripped | Stripped | Unstripped |
| 1 | — | — | — | — | 9.37 | 7.32 |
| 2 | 3.02 | no cure | 3.10 | 1.90 | — | — |
| 5 | 3.60 | 1.99 | 4.22 | 3.10 | 10.98 | 8.59 |
| 10 | 3.79 | 2.96 | 6.41 | 5.49 | | |
| 20 | 3.81 | 3.46 | — | — | | |
| 30 | 3.86 | 3.78 | — | — | | |

TABLE III

COMPARISON OF RATE OF MODULUS DEVELOPMENT OF ONE COMPONENT SEALANTS USING STRIPPED AND UNSTRIPPED MERCAPTAN TERMINATED POLYMERS

100% Modulus $Kg/cm^2$

| | Formulation of Example 9 | | Formulation of Example 10 | | Formulation of Example 13 | |
|---|---|---|---|---|---|---|
| Days | Stripped | Unstripped | Stripped | Unstripped | Stripped | Unstripped |
| 1 | — | — | — | — | 2.67 | 1.83 |
| 2 | 1.25 | no cure | 0.84 | 0.42 | — | — |
| 5 | 1.46 | 0.8 | 1.12 | 0.63 | 3.45 | 2.96 |

TABLE III-continued
COMPARISON OF RATE OF MODULUS DEVELOPMENT OF ONE COMPONENT SEALANTS USING STRIPPED AND UNSTRIPPED MERCAPTAN TERMINATED POLYMERS
100% Modulus Kg/cm²

| | Formulation of Example 9 | | Formulation of Example 10 | | Formulation of Example 13 | |
|---|---|---|---|---|---|---|
| Days | Stripped | Unstripped | Stripped | Unstripped | Stripped | Unstripped |
| 10 | 1.51 | 1.34 | 2.46 | 1.62 | — | — |
| 20 | 1.53 | 1.44 | — | — | — | — |
| 30 | 1.53 | 1.47 | — | — | — | — |

EXAMPLE 11

Formulations were prepared from the stripped and unstripped polymers of Example 2 as follows:

| | |
|---|---|
| Mercaptan Terminated Polyether Polymers of Example 2 | 100 |
| Octyl Decyl Phthalate | 105 |
| Calcium Carbonate | 204 |
| *Thixatrol ST | 10 |
| Xylene | 30 |
| Catalyst Paste | |
| Ferric Dimethyl Dithiocarbamate | 0.14 |
| Calcium Carbonate | 14 |
| Octyl Decyl Phthalate | 3.5 |
| Toluene | 0.36 |

*Trademark of NL Industries

The skin time for the unstripped formulation was 1 hr 20 min while the skin time for the stripped formulation was only 20 min. The tack free time was also reduced from 2 hr 40 min for the unstripped composition to 45 min for the stripped composition.

EXAMPLE 12

Samples of the stripped and unstripped mercaptan terminated polymers of Example 2 were formulated into 2 component sealants as follows:

| | |
|---|---|
| Accelerator | |
| Manganese Dioxide | 1.95 |
| Chlorinated Paraffin | 2.5 |
| Selenium Dimethyl Dithiocarbamate | 0.05 |
| Base | |
| Mercaptan Terminated Polymer | 100 |
| Chlorinated Paraffin | 111 |
| Octyl Benzyl Phthalate | 67 |
| Calcium Carbonate | 622 |

At 25° C. and 50% relative humidity, the stick work life for the unstripped formulation was 14 min as compared to 10 min for the stripped composition. The cure hardness (Shore A) after 30 min was 3 for the unstripped composition as compared to 6 for the stripped composition. After 1 hr, the cure hardness increased to 8 for the unstripped composition as compared to 13 for the stripped composition.

EXAMPLE 13

One component sealant based upon the stripped and unstripped polymers of Example 7 was prepared according to the following formulations:

| | |
|---|---|
| Mercaptan Terminated Polyether Urethane Polymers of Example 7 | 100 |
| Calcium Carbonate | 248 |
| Diisodecyl Phthalate | 109 |
| Thixatrol ST | 8 |
| Xylene | 30 |
| Tetramethyl Guanidin | 0.2 |
| Ferric Dimethyl Dithiocarbamate | 0.8 |

Cure rate determinations were made as in Example 9. Modulus and tensile strength determinations were also done in accordance with Example 9. The results of the tests are shown in Tables I, II and III. Again, a substantial increase in cure rate, tensile strength development and modulus development is shown for the composition containing the stripped polymer.

EXAMPLE 14

Single component sealants based on the stripped and unstripped Mercaptan terminated polythioethers of Example 8 were formulated as follows:

| | |
|---|---|
| Mercaptan Terminated Polythioether Polymers of Example 8 | 100 |
| Titanium Dioxide | 10 |
| Calcium Carbonate | 55 |
| Santicizer 261 (Monsanto Chemical Company) | 52 |
| Strontium Peroxide | 12 |
| Potassium Fluoride | 3 |
| Manganese Octoate | 0.5 |

The skin time and tack free time for the two compositions is as follows:

| | Stripped | Unstripped |
|---|---|---|
| Skin time | 3 hrs. 50 min. | 7 hours |
| Tack Free Time | 12 hrs. | 20 hrs. |

EXAMPLE 15

The stripped and unstripped mercaptan terminated polyethers of Example 2 were formulated into two component sealants as follows:

| | Base |
|---|---|
| Mercaptan Terminated Polyethers of Example 2 | 100 |
| Calcium Carbonate | 350 |
| Diisodecyl Phthalate | 125 |
| DABCO (Diaza bicyclo octane) | 1 |
| Xylene | 3 |
| Accelerator | |
| Epoxy Novolac (*DEN 431) | 4.35 |
| Calcium Carbonate | 5.65 |
| Diisodecyl Phthalate | 1.09 |
| Xylene | .43 |

*Trade mark of Dow Chemical Company

The extrusion rate of each material was followed using 30 PSI pressure and a ⅛" nozzle through a plastic 'Semco' cartridge at 25° C. The time at which the materials gelled at this temperature was also noted. The results are shown in Table IV.

TABLE IV

| Time after mixing | Stripped Polymer of Example 2 | Unstripped Polymer of Example 2 |
|---|---|---|
| | Extrusion Rate (grams/minute) | |
| 1 hour | 159 | 171 |
| 2 hours | 72 | 185 |
| 3¼ hours | — | 49 |
| Gel Time (extrusion rate of zero) | 2¼ hrs. | 5 hrs. |

Having thus described exemplary embodiments of the present invention, it should be noted by those skilled in the art that the within disclosures are exemplary only and that various other alternatives, adaptations and modifications may be made within the scope of the present invention. Accordingly the present invention is not limited to the specific embodiments as illustrated herein, but is only limited by the following claims.

We claim:

1. A method for increasing the cure rate of a liquid mercaptan terminated polymer to a solid elastomer, said liquid mercaptan terminated polymer containing from about 0.5 weight percent to about 3 weight percent low molecular weight mercaptan compounds having a molecular weight of less than about 300 and having an obnoxious smell, said method comprising the steps of:
heating said mercaptan terminated polymer at about 135° to 175° C. and for a sufficient length of time to vaporize at least about 50 weight percent of said low molecular weight obnoxious semlling mercaptan containing compounds, but not to decompose said liquid mercaptan terminated polymer, to thereby obtain a stripped liquid mercaptan terminated polymer having an increased cure rate and a reduced obnoxious mercaptan odor;
separating the vapor containing low molecular weight mercaptan compounds from said stripped liquid mercaptan terminated polymer.

2. A method for increasing cure rate of a liquid mercaptan terminated polymer to a solid elastomer, said liquid mercaptan terminated polymer containing from about 0.5 weight percent to about 3 weight percent of low molecular weight mercaptan compounds having a molecular weight less than about 300 and having an obnoxious smell, said method comprising the steps of:
forming a film of said liquid mercaptan terminated polymer having a thickness of less than about 6 mm;
heating said film to a sufficient temperature and for a sufficient length of time to vaporize at least about 50 weight percent of said low molecular weight obnoxious smelling mercaptan compounds, but not decomposing said liquid mercaptan terminated polymer, thereby obtaining a stripped liquid mercaptan terminated polymer having an increased cure rate and a reduced obnoxious mercaptan odor; and
separating the vapor containing low molecular weight mercaptan compounds from said stripped liquid mercaptan terminated polymer.

3. A method according to claim 2 wherein a vacuum is applied to said film during vaporization of said low molecular weight mercaptan containing compounds.

4. A method according to claim 3 wherein the vacuum applied to the film is between 1 mm Hg and 100 mm Hg.

5. A method according to claim 4 wherein the temperature to which the film of liquid mercaptan terminated polymer is heated is between room temperature and 200° C.

6. A method according to claim 5 wherein the temperature to which the film of liquid mercaptan terminated polymer is heated between 135° C. and 175° C.

7. A method according to claim 2 wherein said film has a thickness of between about 1 mm and 6 mm.

8. A method according to claim 2 including, prior to forming a film of said liquid mercaptan terminated polymer having a thickness of less than about 6 mm., the additional step of mixing an organic solvent for said liquid mercaptan terminated polymer with said liquid mercaptan terminated polymer to provide a lower viscosity polymer containing said solvent.

9. A method according to claim 8 wherein said organic solvent which is mixed with said liquid mercaptan terminated polymer to provide a lower viscosity polymer containing said organic solvent has a boiling point at atmospheric pressure which is at or below, but not more than 50° C. below, the temperature to which said film formed from said lower viscosity polymer is heated.

10. A method according to claim 2 wherein the step of separating said vapors includes contacting said film with a flowing stream of inert gas.

11. A method according to claim 10 wherein said inert gas is selected from the group consisting of nitrogen and carbon dioxide.

12. A method according to claim 8 wherein the range of organic solvent mixed with the liquid mercaptan terminated polymer is between 10–35 percent by weight of said liquid mercaptan terminated polymer.

13. A method according to claim 8 wherein said organic solvent is selected from the group consisting of xylene, toluene and aromatic naphthas having a boiling point of between 100° C. and 150° C.

14. A method according to claim 8 wherein said film is formed by continually flowing said lower viscosity polymer over a surface from an upstream end of said surface to a downstream end of said surface, wherein said heating and vaporization of said low molecular weight mercaptan compounds occur between said upstream and downstream ends to form said stripped polymer and wherein said method includes the step of collecting said stripped polymer as it flows from said downstream end.

15. A method according to claim 14 where the temperature of the liquid polymer film is between about 100° and 200° C., the vacuum applied is between about 1 mm and 100 mm Hg, and the polymer film thickness is between about 1 mm to 6 mm.

16. A method according to claim 15 wherein the time it takes the lower viscosity polymer to flow from said upstream end of said surface to said downstream end is less than 1 minute.

17. A method according to claim 16 wherein a vertical cylindrical wiped film evaporator is used to carry out the steps of the invention.

18. A method accroding to claim 1 wherein the molecular weight of said liquid mercaptan terminated polymer is above about 1,000.

* * * * *